US006865326B2

(12) United States Patent
Kato

(10) Patent No.: US 6,865,326 B2
(45) Date of Patent: Mar. 8, 2005

(54) OPTICAL TRANSMISSION LINE AND OPTICAL TRANSMISSION SYSTEM

(75) Inventor: Takatoshi Kato, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 199 days.

(21) Appl. No.: 09/776,720

(22) Filed: Feb. 6, 2001

(65) Prior Publication Data

US 2001/0017969 A1 Aug. 30, 2001

(30) Foreign Application Priority Data

Feb. 7, 2000 (JP) ........................................ 2000-029230

(51) Int. Cl.$^7$ ............................ H04B 10/12; G02B 6/16
(52) U.S. Cl. ........................................ 385/123; 385/27
(58) Field of Search ................... 385/27, 100, 123–128; 359/109; 398/142, 147, 81, 82

(56) References Cited

U.S. PATENT DOCUMENTS

| | | | |
|---|---|---|---|
| 5,361,319 A | | 11/1994 | Antos et al. |
| 5,905,838 A | * | 5/1999 | Judy et al. ................... 385/123 |
| 5,995,694 A | | 11/1999 | Akasaka et al. |
| 6,263,138 B1 | * | 7/2001 | Sillard et al. ............... 385/123 |

FOREIGN PATENT DOCUMENTS

GB  2 299 473 A  10/1996

OTHER PUBLICATIONS

Madani, F. M. et al. "Performance Limit of Long–Distance WDM Dispersion–Managed Transmission System Using Higher Order Dispersion Compensation Fibers" IEEE Photonics Technology Letters, IEEE Inc. New York, US, vol. 11, No. 5, May 1999, pp. 608–610.

M. Murakami, H. Maeda, and T. Imai, "Long–Haul 16×10 WDM Transmission Experiment Using Higher Order Fiber Dispersion Management Technique," Ecoc, Sep. 1998, pp. 313–314.

Fariborz Mousavi Madani, and Kazuro Kikuchi, "Performance Limit of Long–Distance WDM Dispersion–Managed Transmission System Using Higher Order Dispersion Compensation Fibers," IEEE Photonics Technology Letters, vol. 11, No. 5, May 1999, pp. 608–610.

Yoshio Yokoyama, Takatoshi Kato, Masaaki Hirano, Masashi Onishi, Eisuke Sasaoka, Yoshinori Makio, Masayuki Nishimura, "Practically Feasible Dispersion Flattened Fibers Produced by Vad Technique," ECOC, Sep. 1998, pp. 131–132.

N. Edagawa, I. Morita, M. Suzuki, S. Yamamoto, K. Tanaka, and S. Akiba, "Long Distance Soliton WDM Transmission Using a Dispersion–Flattened Fiber," OFC'97, PD19–1, PD19–4.

* cited by examiner

Primary Examiner—Brian Healy
Assistant Examiner—Michael P. Mooney
(74) Attorney, Agent, or Firm—McDermott Will & Emery LLP

(57) ABSTRACT

An optical transmission line and an optical transmission system, the handling of which is easy, and in which transmission loss and the absolute value of cumulative chromatic dispersion is small over a wide wavelength range are proposed. The optical transmission system has a transmitter, a receiver and an optical transmission line. The optical transmission line has an optical transmission fiber and a dispersion-compensating fiber. The optical transmission fiber has a chromatic dispersion of +4~+10 ps·nm$^{-1}$·km$^{-1}$ and a dispersion slope of 0~+0.04 ps·nm$^{-2}$·km$^{-1}$ at the 1550 nm wavelength and is installed in a relay section. The dispersion compensating fiber has a chromatic dispersion of −40 ps·nm$^{-1}$·km$^{-1}$ or less and a dispersion slope of −0.10 ps·nm$^{-2}$·km$^{-1}$ or less at the 1550 wavelength and is wound in a coil to be put in a repeater.

12 Claims, 2 Drawing Sheets

OPTICAL TRANSMISSION LINE AND OPTICAL TRANSMISSION SYSTEM

BACKGROUND OF THE INVENTION

1. Field of the Invention

The present invention relates to an optical transmission line that transmits signal light, and to an optical transmission system having the optical transmission line.

2. Related Background Arts

In an optical transmission system, it is desirable to lessen the absolute value of cumulative chromatic dispersion of the optical transmission line at a signal light wavelength in order to restrain the waveform degradation of the signal light. Also, in a Wavelength Division Multiplexing (WDM) transmission system, in which optical communication is performed by multiplexing signal light of plural wavelengths, it is desirable that the absolute value of cumulative chromatic dispersion of the optical transmission line be small in a wide wavelength range so that optical communication can be performed in a volume as large as possible by multiplexing the signal light as much as possible. Therefore, generally by connecting various kinds of optical fibers or by providing a dispersion compensation module to compensate for the dispersion of an optical fiber, the absolute value of the cumulative chromatic dispersion is made small in a wide wavelength range.

For example, in the technologies disclosed in Literature 1: M. Murakami, et al., "Long-haul 16×10 WDM Transmission Experiment Using Higher Order Fiber Dispersion Management Technique", ECOC'98, pp.313–314 (1998) as well as Literature 2: F. M. Madani, et al, "Performance Limit of Long-distance WDM Dispersion-managed Transmission System Using Higher Order Dispersion Compensation Fibers", IEEE Photon. Technol. Lett., Vol.11, No.5, pp. 608–610 (1999), the absolute value of cumulative chromatic dispersion is made small by connecting a standard 1.3 μm band zero dispersion optical fiber which has a zero dispersion wavelength near the 1310 nm wavelength, and in which both the chromatic dispersion and the dispersion slope are positive at the 1550 nm wavelength, with a dispersion compensating optical fiber in which both the chromatic dispersion and the dispersion slope are negative at the 1550 nm wavelength. The dispersion compensating optical fiber is, in some cases, installed in a relay section together with the 1.3 μm band zero dispersion optical fiber, and in other cases, it is rolled up in a coil as a dispersion compensation module to be put in a repeater or a receiver.

Literature 3: Y. Yokoyama, et al., "Practically Feasible Dispersion Flattened Fibers Produced by VAD Technique", ECOC'98, pp.131–132 (1998) discloses a positive dispersion optical fiber and a negative dispersion optical fiber: the former has a positive chromatic dispersion and a small absolute value of dispersion slope at the 1550 nm wavelength, whereas in the latter the chromatic dispersion is negative and the absolute value of the dispersion slope is small. When these two optical fibers are connected, the absolute value of cumulative chromatic dispersion of the optical transmission line diminishes in a wide wavelength range.

As for the dispersion compensation that uses a dispersion compensation module, the installation and maintenance are easy. However, the transmission loss of the dispersion compensating optical fiber used in the dispersion compensation module is greater than that of other optical fibers. In addition the longer the length of the 1.3 μm band zero dispersion optical fiber, the longer the dispersion compensating optical fiber must be in the dispersion compensation module. Accordingly, the transmission loss of the optical transmission line becomes greater as a whole.

On the other hand, in a case where a 1.3 μm band zero dispersion optical fiber and a dispersion compensating optical fiber are coupled to be installed in a relay section, or in a case where a positive dispersion optical fiber and a negative dispersion optical fiber are coupled to be installed in a relay section, the loss in the whole optical transmission line becomes small as compared with in the where a dispersion compensation module is provided. However, different kinds of optical fibers must be connected within a cable; such connecting work and the maintenance are complex.

SUMMARY OF THE INVENTION

It is an object of the present invention to provide an optical transmission line in which the absolute value of cumulative chromatic dispersion is small in a wide wavelength range and which exhibits a small loss and is easy to handle, as well as an optical transmission system using such an optical transmission line.

In order to achieve this and other objects, an optical transmission line is provided which comprises (1) an optical transmission fiber having a chromatic dispersion of +4 to +10 ps·nm$^{-1}$·km$^{-1}$ and a dispersion slope of 0 to +0.04 ps·nm$^{-2 \cdot km-1}$ at the 1550 nm wavelength and installed in a relay section, and (2) a module made of dispersion compensating optical fiber having a chromatic dispersion of −40 ps·nm$^{-1}$·km$^{-1}$ or less and a dispersion slope of −0.10 ps·nm$^{-2}$·km$^{-1}$ or less at the 1550 nm wavelength.

An optical transmission system is also provided in which a transmitter and a receiver are added to this transmission line.

In an embodiment of the present invention, the dispersion slope is +0.01 to +0.03 ps·nm$^{-2}$·km$^{-1}$, and the effective area is equal to or more than 45 μm$^2$. The chromatic dispersion is −80 ps·nm$^{-1}$·km$^{-1}$ or less, more preferably, −100 ps·nm$^{-1}$·km$^{-1}$ or less, and the dispersion slope is −0.20 ps·nm$^{-2}$·km$^{-1}$ or less.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
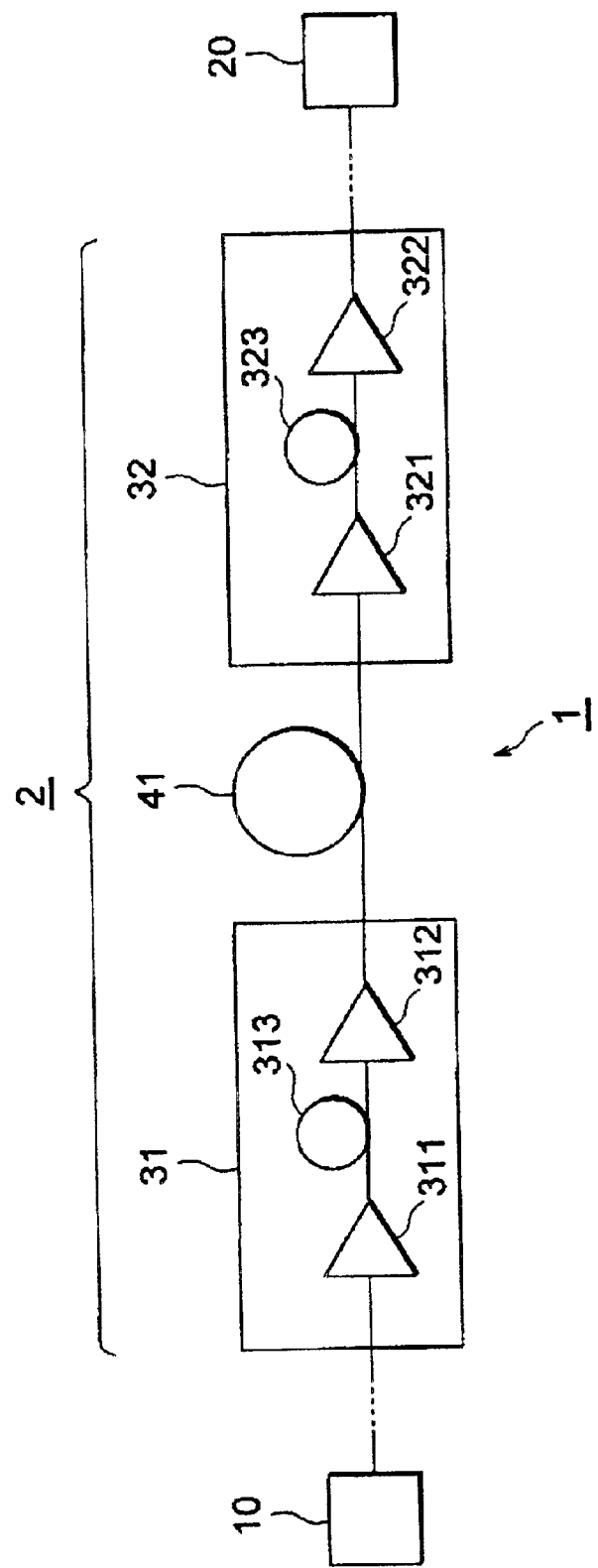
FIG. 1 is a diagram showing the constitution of an optical transmission system and an optical transmission line according to an embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

The optical transmission system 1 shown in FIG. 1 is equipped, as an optical transmission line 2, with a repeater 31, an optical transmission fiber 41, and a repeater 32, at least in a part of the transmission path of signal light that extends from a transmitter 10 to a receiver 20. The repeater 31 comprises an optical amplifier 311, a dispersion compensating optical fiber 313, and an optical amplifier 312. The repeater 32 has an optical amplifier 321, a dispersion compensating optical fiber 323, and an optical amplifier 322.

The transmitter 10 sends out signal light of plural wavelengths in the 1.55 µm wavelength band after multiplexing the wavelengths. The signal light propagates the optical transmission line 2 to the receiver 20. The receiver 20 receives the signal light, demultiplexing it to each wavelength.

The optical transmission fiber 41 exhibits a chromatic dispersion of +4 to +10 $ps \cdot nm^{-1} \cdot km^{-1}$, and a dispersion slope of 0 to +0.04 $ps \cdot nm^{-2} \cdot km^{-1}$ at the 1550 nm wavelength. It is installed in the relay section from the repeater 31 to the repeater 32. Each of the dispersion compensating optical fibers 313, 323 has a chromatic dispersion of −40 $ps \cdot nm^{-1} \cdot km^{-1}$ or less at the 1550 nm wavelength, and a dispersion slope of −0.10 $ps \cdot nm^{-2} \cdot km^{-1}$ or less. It is rolled up in a coil as a module to be provided within the repeaters 31, 32. The optical transmission fiber 41 and the dispersion compensating optical fibers, 313, 323 are made of silica-based glass, and it is possible to design and produce a refractive index profile appropriately so as to give the above-mentioned characteristics of chromatic dispersion and dispersion slope, respectively.

Each of the optical amplifiers 311, 312, 321, and 322 amplifies the signal light of plural wavelengths altogether. An amplifier using an Er-doped optical fiber in which Er element is added to the light path region is preferable. The optical amplifier 311 is positioned in the first part of the dispersion compensating optical fiber 313 in the repeater 31, and the optical amplifier 312 is provided in the latter part of the dispersion compensating optical fiber 313. In the same way, the optical amplifier 321 is positioned in the first part of the compensating optical fiber 323 in the repeater 32, and the optical amplifier 322 is provided in the latter part of the dispersion compensating optical fiber 323.

In the optical transmission system 1 and optical transmission line 2 thus constituted, at the 1550 nm wavelength, the sign of the chromatic dispersion of the optical transmission fiber 41 and that of each of the dispersion compensating optical fibers 313, 323 differ from each other. Also, the sign of the chromatic dispersion slope of optical transmission fiber 41 and that of each of the dispersion compensating optical fibers 313, 323 are different from each other. Consequently, the absolute value of cumulative chromatic dispersion of the optical transmission line 2 can be made small in a wide wavelength range by setting an appropriate ratio between the length of the optical transmission fiber 41 and each length of the dispersion compensating optical fibers 313, 323. Therefore, a broad bandwidth WDM transmission as well as a high bit rate transmission becomes possible. Also, in order to decrease the absolute value of the cumulative chromatic dispersion of the optical transmission line 2 in a wide wavelength range, it is preferable that the optical transmission fiber 41 exhibit a dispersion slope of +0.01 to +0.03 $ps \cdot nm^{-2} \cdot km^{-1}$ at the 1550 nm wavelength.

As compared with a standard 1.3 µm band zero dispersion optical fiber, the length of the dispersion compensating optical fibers 313, 323 that is necessary for compensating the chromatic dispersion and the dispersion slope can be short because the chromatic dispersion and the dispersion slope of the optical transmission fiber 41 are small at the 1550 nm wavelength. Therefore, the loss of signal light in the dispersion compensating optical fibers 313, 323 is small. Accordingly, the loss of signal light in the optical transmission line 2 is also small as a whole.

In order to make the loss of signal light smaller by making the dispersion compensating optical fibers 313, 323 shorter, the dispersion compensating optical fibers 313, 323 preferably have a chromatic dispersion of −80 $ps \cdot nm^{-1} \cdot km^{-1}$ or less, and a dispersion slope of −0.20 $ps \cdot nm^{-2} \cdot km^{-1}$ or less at the 1550 nm wavelength, and more preferably, a chromatic dispersion of −100 $ps \cdot nm^{-1} \cdot km^{-1}$ or less at the 1550 nm wavelength.

Also, because to the loss of signal light in the optical transmission line 2 is small, the power of signal light which is emitted from each of the transmitter 10 and the repeaters 31, 32 is allowed to be small, and accordingly, the occurrence of the nonlinear optical phenomenon is restrained. Therefore, it is sufficient to provide only either one of the optical amplifiers 311 or 312 in the repeater 31, and either of the optical amplifiers 321 or 322 in the repeater 32. Incidentally, in order to restrain the occurrence of the nonlinear optical phenomenon more sufficiently, the optical transmission fiber 41 preferably has an effective area equal to or more than 45 µm² in the 1550 nm wavelength.

Moreover, the installation and the maintenance of this dispersion compensation module are easy because the dispersion compensating optical fibers 313, 323 are not laid but are rolled up in a coil as a module and are provided inside the repeaters 31, 32.

Next, the implementation examples of the optical transmission line 2 according to the present embodiment are explained in comparison with the comparative examples. In each of the implementation examples and the comparative example shown in Table I, the optical transmission fiber has a length of 80 km, and the dispersion compensating optical fiber has a length that is sufficient to compensate the chromatic dispersion of the optical transmission fiber at the 1550 nm wavelength. The optical transmission fiber of the comparative example is a 1.3 µm band zero dispersion optical fiber. Each characteristic is a value at 1550 nm.

TABLE I

|  | Implementation examples | | | | Comparative example |
|---|---|---|---|---|---|
| Example # | 1 | 2 | 3 | 4 | example |
| Optical transmission fiber | | | | | |
| Chromatic dispersion $ps \cdot nm^{-1} \cdot km^{-1}$ | 5.7 | 5.7 | 5.7 | 5.7 | 17 |
| Dispersion slope $ps \cdot nm^{-2} \cdot km^{-1}$ | 0.024 | 0.019 | 0.024 | 0.019 | 0.056 |
| Effective area µm² | 47 | 61 | 47 | 61 | — |

TABLE I-continued

|  | Implementation examples | | | | Comparative |
|---|---|---|---|---|---|
| Example # | 1 | 2 | 3 | 4 | example |
| Dispersion compensating fiber | | | | | |
| Chromatic dispersion ps · nm$^{-1}$ · km$^{-1}$ | −110 | −110 | −52.8 | −52.8 | −110 |
| Dispersion slope ps · nm$^{-2}$ · km$^{-1}$ | −0.270 | −0.270 | −0.120 | −0.120 | −0.270 |
| Effective area μm$^2$ | 14 | 14 | 18 | 18 | — |
| Fiber length km | 4.2 | 4.2 | 8.7 | 8.7 | 12.4 |
| Loss dB | 2.6 | 2.6 | 2.8 | 2.8 | 7.6 |

The comparison between each implementation example and a comparative example is as follows. As for the length of the dispersion compensating optical fibers, the comparative example is 12.4 km, whereas that of each implementation examples 1 and 2 is 4.2 km, and implementation examples 3 and 4 is 8.7 km, respectively; thus, each implementation example is shorter than the comparative example. As to the loss of signal light in the dispersion compensating optical fibers, the comparative example is 7.6 dB, whereas that of each implementation examples 1 and 2 is 2.6 dB, and that of each implementation examples 3 and 4 is 2.8 dB; thus, each implementation example is smaller than the comparative example by about 5 dB. Therefore, in each implementation example, the S/N ratio improves by about 5 dB as compared with the comparative example. Also, it is possible to restrain the occurrence of the nonlinear optical phenomenon by decreasing the power of signal light because the deterioration of the S/N ratio of signal light in the dispersion compensating optical fiber is small.

A comparison between implementation examples 1 and 2, and implementation examples 3 and 4, show that as to the length of the dispersion compensating optical fiber the former is 4.2 km, and the latter is 8.7 km, whereas they are almost the same with respect to the loss of signal light in the dispersion compensating optical fibers. This is because the latter is smaller than the former with respect to the transmission loss of the dispersion compensating optical fibers per unit length.

Figure 2:
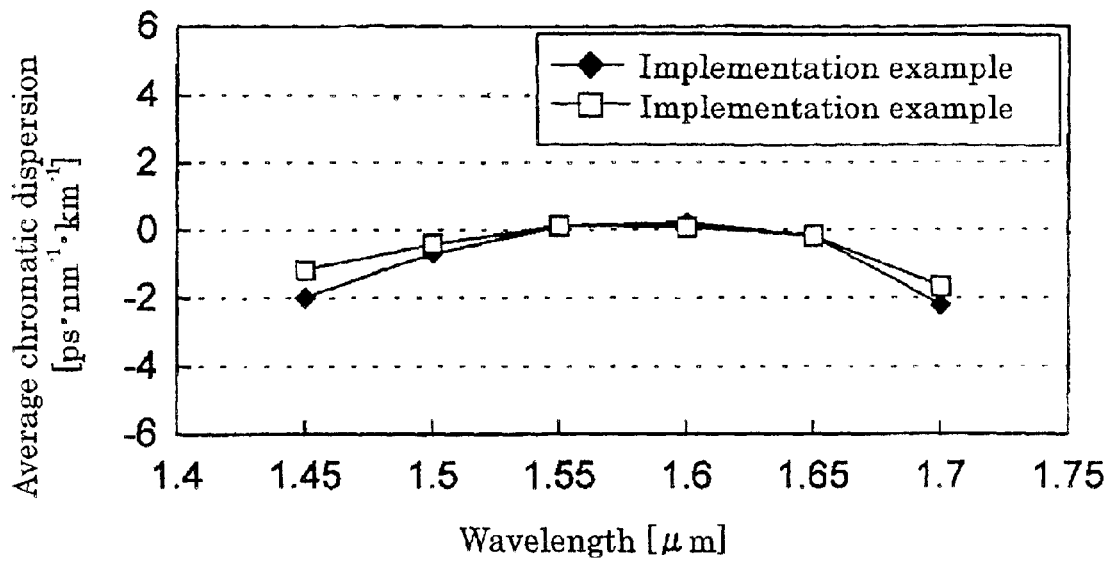
FIG. 2 is a graph showing an average chromatic dispersion of the optical transmission line in each of Implementation examples 1 and 2.
Figure 3:
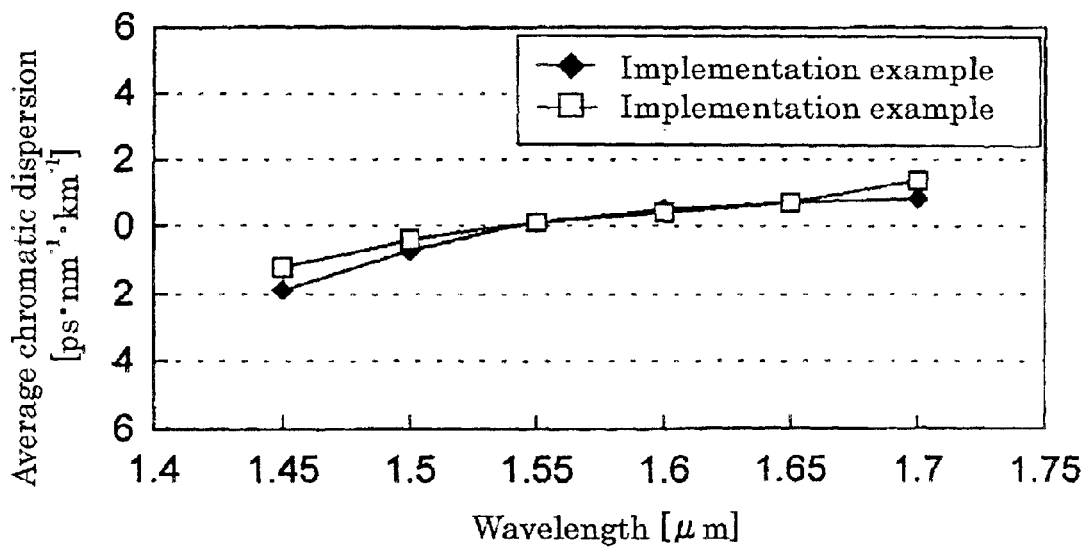
FIG. 3 is a graph showing an average chromatic dispersion of the optical transmission line in each of Implementation examples 3 and 4.

As shown in FIGS. 2 and 3, the average chromatic dispersion of the whole optical transmission line in which an optical transmission fiber and a dispersion compensating optical fiber are connected is zero at the 1550 nm wavelength in each implementation example. Also, the average dispersion slope of the whole optical transmission line in which an optical transmission fiber and a dispersion compensating optical fiber are connected is small at the 1550 nm wavelength in each implementation example. Consequently, the absolute value of cumulative chromatic dispersion of the optical transmission line is small in a broad bandwidth in each implementation example, and broad bandwidth WDM transmission and high bit rate transmission are possible.

What is claimed is:

1. An optical transmission line comprising:
    an optical transmission fiber having a chromatic dispersion of +4 to +10 ps·nm$^{-1}$·km$^{-1}$ and a dispersion slope of 0 to +0.04 ps·nm$^{-2}$·km$^{-1}$ at the 1550 nm wavelength and installed in a relay section; and
    a module made of a dispersion compensating optical fiber having a chromatic dispersion of −40 ps·nm$^{-1}$·km$^{-1}$ or less and a dispersion slope of −0.10 ps·nm$^{-2}$·km$^{-1}$ or less at the 1550 nm wavelength,
    wherein said dispersion compensating optical fiber has a lenght that is sufficient to substantially compensate the chromatic dispersion of said optical transmission fiber at the 1550 nm wavelenght and loss of said module at the 1550 nm wavelength is not more than 0.035 dB per unit kilometer of said optical transmission fiber.

2. An optical transmission line according to claim 1, wherein said optical transmission fiber has a dispersion slope of +0.01 to +0.03 ps·nm$^{-2}$·km$^{-1}$.

3. An optical transmission line according to claim 1, wherein said optical transmission fiber has an effective area of 45 μm$^2$ or more at the 1550 nm wavelength.

4. An optical transmission line according to claim 1, wherein said dispersion compensating optical fiber has a chromatic dispersion of −80 ps·nm$^{1}$·km$^{-1}$ or less and a dispersion slope of −0.20 ps·nm$^{-2}$·km$^{-1}$ or less.

5. An optical transmission line according to claim 4, wherein said dispersion compensating optical fiber has a chromatic dispersion of −100 ps·nm$^{-1}$·km$^{-1}$ or less.

6. An optical transmission system comprising:
    an optical transmission fiber having a chromatic dispersion of +4 to +10 ps·nm$^{-1}$·km$^{-1}$ and a dispersion slope of 0 to +0.04 ps·nm$^{-2}$·km$^{-1}$ at the 1550 nm wavelength and installed in a relay section;
    a module made of a dispersion compensating optical fiber having a chromatic dispersion of −40 ps·nm$^{-1}$·km$^{-1}$ or less and a dispersion slope of −0.10 ps·nm$^{-2}$·km$^{-1}$ or less at the 1550 nm wavelength;
    a transmitter; and
    a receiver, wherein said dispersion compensating optical fiber has a length that is sufficient to substantially compensate the chromatic dispersion of said module at the 1550 nm wavelength is not more than 0.035 dB per unit kilometer of said optical transmission fiber.

7. An optical transmission line comprising:
    an optical transmission fiber having a chromatic dispersion of +4 to +10 ps·nm$^{-1}$·km$^{-1}$ and a dispersion slope of 0 to 0.04 ps·nm$^{-2}$·km$^{-1}$ at the 1550 wavelength and installed in a relay section; and
    a module made of a dispersion compensating optical fiber having a chromatic dispersion of −40 ps·nm$^{-1}$·km$^{-1}$ or less at the 1550 nm wavelength,
    wherein an average chromatic dispersion of the optical transmission line is not less than −2 ps/nm/km and not more than 2 ps/nm/km from 1.5 μm to 1.6 μm inclusive.

8. An optical transmission line according to claim 7, whrerein the average chromatic dispersion of the optical transmission line is not less than −1 ps/nm/km and not more than 1 ps/nm/km from 1.5 μm to 1.6 μm inclusive.

9. An optical transmission line according to claim 8, wherein said optical transmission fiber as a dispersion slope of +0.01 to +0.03 ps·nm$^{-2}$·km$^{-1}$.

10. An optical transmission line according to claim 8, wherein said optical transmission fiber has an effective area of 45 μm$^2$ or more at the 1550 nm wavelength.

11. An optical transmission line according to claim 8, wherein said dispersion compensating optical fiber has a chromatic dispersion of −80 ps·nm$^{1}$·km$^{-1}$ or less and a dispersion slope of −0.20 ps·nm$^{-2}$·km$^{-1}$ or less.

12. An optical transmission line according to claim 11, wherein said dispersion compensating optical fiber has a chromatic dispersion of −100 ps·nm$^{-1}$·km$^{-1}$ or less.

* * * * *

UNITED STATES PATENT AND TRADEMARK OFFICE
CERTIFICATE OF CORRECTION

PATENT NO. : 6,865,326 B2
DATED : March 8, 2005
INVENTOR(S) : Takatoshi Kato

It is certified that error appears in the above-identified patent and that said Letters Patent is hereby corrected as shown below:

<u>Column 6,</u>
Lines 34-35, change "compensate the chormatic dispersion of said module at the 1550 nm" to -- compensate the chormatic dispersion of said optical transmission fiber at the 1550 nm wavelength and loss of said module at the 1550 nm --;
Line 44, change "less at the 1550 nm wavelength" to -- less and a dispersion slope of -0.10 ps · nm · 2 · km · 1 or less at the 1550 wavelength --;
Line 53, change "transmission fiber as a dispersion" to -- transmission fiber has a dispersion --.

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,865,326 B2
DATED         : March 8, 2005
INVENTOR(S)   : Takatoshi Kato It is certified that error appears in the above-identified patent and that said Letters Patent is hereby corrected as shown below:

Column 6,
Lines 34-35, change "compensate the chromatic dispersion of said module at the 1550 nm" to -- compensate the chormatic dispersion of said optical transmission fiber at the 1550 nm wavelength and loss of said module at the 1550 nm --;
Line 44, change "less at the 1550 nm wavelength" to -- less and a dispersion slope of -0.10 ps · nm · 2 · km · 1 or less at the 1550 wavelength --;
Line 53, change "transmission fiber as a dispersion" to -- transmission fiber has a dispersion --.

This certificate supersedes Certificate of Correction issued May 31, 2005.

Signed and Sealed this

Twenty-fifth Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,865,326 B2
DATED : March 8, 2005
INVENTOR(S) : Takatoshi Kato

It is certified that error appears in the above-identified patent and that said Letters Patent is hereby corrected as shown below:

Column 6,
Lines 34-35, change "compensate the chromatic dispersion of said module at the 1550 nm" to -- compensate the chromatic dispersion of said optical transmission fiber at the 1550 nm wavelength and loss of said module at the 1550 nm --;
Line 44, change "less at the 1550 nm wavelength" to -- less and a dispersion slope of -0.10 ps · nm · 2 · km · 1 or less at the 1550 wavelength --;
Line 53, change "transmission fiber as a dispersion" to -- transmission fiber has a dispersion --.

This certificate supersedes Certificate of Correction issued May 31, 2005 and October 25, 2005.

Signed and Sealed this

Seventh Day of February, 2006

JON W. DUDAS
*Director of the United States Patent and Trademark Office*